US010251515B2

(12) United States Patent
Hosner

(10) Patent No.: US 10,251,515 B2
(45) Date of Patent: Apr. 9, 2019

(54) SAFETY SYSTEM FOR HOUSEHOLD FOOD-PROCESSING DEVICE

(71) Applicant: KONINKLIJKE PHILIPS N.V., Eindhoven (NL)

(72) Inventor: Mario Hosner, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 1082 days.

(21) Appl. No.: 14/421,038

(22) PCT Filed: Aug. 14, 2013

(86) PCT No.: PCT/EP2013/066965
§ 371 (c)(1),
(2) Date: Feb. 11, 2015

(87) PCT Pub. No.: WO2014/029670
PCT Pub. Date: Feb. 27, 2014

(65) Prior Publication Data
US 2015/0216360 A1  Aug. 6, 2015

(30) Foreign Application Priority Data
Aug. 23, 2012 (EP) .................................... 12181468

(51) Int. Cl.
*A47J 43/07* (2006.01)

(52) U.S. Cl.
CPC ......... *A47J 43/0755* (2013.01); *A47J 43/075* (2013.01); *A47J 43/0761* (2013.01); *A47J 43/0766* (2013.01); *Y10T 29/49826* (2015.01)

(58) Field of Classification Search
CPC .. A47J 43/075; A47J 43/0755; A47J 43/0761; A47J 43/0766; A47J 43/0772;
(Continued)

(56) References Cited

U.S. PATENT DOCUMENTS 4,540,128 A * 9/1985 Breeden ............... B26D 7/0608
                                                 241/282.1
5,156,084 A * 10/1992 Lin .......................... A47J 43/06
                                                 210/380.1
(Continued)

FOREIGN PATENT DOCUMENTS

EP     1483995 A1    12/2004
EP     2384676    *  11/2011
(Continued)

*Primary Examiner* — Jessica Cahill
*Assistant Examiner* — Smith O Bapthelus

(57) ABSTRACT

The present invention relates to household food-processing devices. In order to provide a household food-processing device with a mounting system ensuring that it is not possible to touch the processing tool in an operating state, a household food-processing device (10) is provided that comprises a base unit (12), a processing tool unit (14) with a processing tool (18) for processing supplied food, and a receiving unit (16) with a receiving volume (20) for receiving the processed food. The base unit provides a driving force for actuating the processing tool. The receiving unit is mountable to the processing tool unit, and the base unit is mountable to the processing tool unit. The processing tool unit is provided with a safety mounting mechanism (38) defining a mounting order, according to which the base unit is mountable to the processing tool unit only when the receiving unit is mounted to the processing tool unit; and according to which the de-mounting of the receiving unit from the processing tool unit is blocked when the base unit is mounted to the processing tool unit.

13 Claims, 11 Drawing Sheets

(58) Field of Classification Search
CPC .. A47J 27/10; A47J 44/02; A47J 27/04; A47J 43/0711; A23L 5/13; Y10T 292/096
USPC .......... 241/37.5, 92; 99/503, 507, 510, 511, 99/513, 537, 538; 206/501–520; 220/4.26, 4.31, 4.34, 8
See application file for complete search history.

(56) References Cited

U.S. PATENT DOCUMENTS

| | | | |
|---|---|---|---|
| 6,340,124 B1* | 1/2002 | Charles | A47J 27/0813 241/282.1 |
| 8,122,820 B2* | 2/2012 | Conti | A47J 43/0711 241/101.01 |
| 2003/0071150 A1* | 4/2003 | Ruttimann | A47J 43/0711 241/92 |
| 2011/0049279 A1* | 3/2011 | Beber | A47J 43/0716 241/88 |
| 2011/0083566 A1* | 4/2011 | Backus | A47J 19/027 99/511 |

FOREIGN PATENT DOCUMENTS

| | | |
|---|---|---|
| EP | 2384676 A1 | 11/2011 |
| EP | 2564745 A1 | 3/2013 |
| FR | 2756477 A1 | 6/1998 |
| WO | 9622720 A1 | 8/1996 |
| WO | WO 96/22720 * | 8/1996 |
| WO | 9824350 A1 | 6/1998 |
| WO | 2005065506 A2 | 7/2005 |
| WO | 2006092477 A1 | 9/2006 |

* cited by examiner

SAFETY SYSTEM FOR HOUSEHOLD FOOD-PROCESSING DEVICE

This application is the U.S. National Phase application under 35 U.S.C. § 371 of International Application No. PCT/EP2013/066965, filed on Aug. 14, 2013, which claims the benefit of International Application No. 12181468.5 filed Aug. 23, 2012. These applications are hereby incorporated by reference herein.

FIELD OF THE INVENTION

The present invention relates to a household food-processing device and a method for a safety assembly of a household food-processing device.

BACKGROUND OF THE INVENTION

Household food-processing devices, also known as food processor, are used for mechanically processing foodstuffs. As an example, mechanical processing of the foodstuff refers to slicing, chopping, cutting, dicing, crushing, or grating. For different reasons, household food-processing devices have two or more units that are assembled or put together for operation of the household food-processing device. Besides storage aspects and cleaning issues, also the possibility to exchange a tool is thus provided. For example, a bowl is used as first unit, on top of which the so-called processing tool is arranged as second unit. A base unit is placed on top in order to transmit forces, for example, from a hand-blender providing the driving force, via a gearing mechanism to a drive shaft of the processing tool, finally operating the tool itself, for example a rotating knife or blade, or cutting or slicing plate or grating disk. For safety reasons, it is a requirement that unintended interaction of the user with a rotating tool should be prevented.

SUMMARY OF THE INVENTION

Thus, there is a need to provide a household food-processing device with a mounting system ensuring that it is not possible to touch the processing tool in an operating state.

The object of the present invention is solved by the subject-matter of the independent claims, wherein further embodiments are incorporated in the dependent claims.

It should be noted that the following described aspects of the invention apply also for the household food-processing device, and the method for a safety assembly of a household food-processing device.

According to a first aspect of the present invention, a household food-processing device is provided, comprising a base unit, a processing tool unit with a processing tool for processing supplied food, and a receiving unit with a receiving volume for receiving the processed food. The base unit provides a driving force for actuating the processing tool. The receiving unit is mountable to the processing tool unit, and the base unit is mountable to the processing tool unit. The processing tool unit is provided with a safety mounting mechanism defining a mounting order, according to which the base unit is mountable to the processing tool unit only when the receiving unit is mounted to the processing tool unit, and according to which the de-mounting of the receiving unit from the processing tool unit is blocked when the base unit is mounted to the processing tool unit.

The household food-processing device is a household food-processing tool, which can also be referred to as a food processor. The household food-processing device is provided with a safety system ensuring that only one mounting order is possible, which mounting order ensures that it is not possible to put the device into operation, as long as the receiving unit is not mounted. The receiving unit is also referred to as a bowl. The receiving unit may also be referred to as a container with a container base and a container wall. The receiving unit may be provided with a handle.

The household food-processing device is portable, for example to be stored in a shelf while being usable on any usable surface in a kitchen.

The processing tool unit may be provided with an exchangeable tooling insert, for example with a cutting knife, a cutting, slicing or grating disc-shape element or a cube-cutting device with a cube-cutting grid combined with a rotating knife or blade.

The base unit, together with the processing tool unit, may act as a lid on the receiving unit. The actual drive for the processing tool unit is arranged in or on top of the base unit. The receiving unit is closed by the processing tool unit and by the base unit.

According to an exemplary embodiment, the receiving unit, the processing tool unit, and the base unit are mountable in an order of mounting, which is in a direction reverse from a feed-through direction of foodstuff to be processed.

The term "feed-through direction" relates to a general direction of the food passing the machine while being processed, for example from the top to the bottom.

According to an exemplary embodiment, the receiving unit is detachably mounted to the processing tool unit with a first interlocking mechanism, and the base unit is detachably mounted to the processing tool unit with a second interlocking mechanism. The safety mounting mechanism comprises a safety locking device, with at least one safety latch acting between the first and the second interlocking mechanism.

According to an exemplary embodiment, the safety locking device is provided to detect a mounted receiving unit, and the safety locking device is configured to release a blocking of the second interlocking mechanism for mounting of the base unit in case of a detected receiving unit.

The detection of the receiving unit may also be referred to as bowl detection. The safety system can thus be referred to as bowl detection system.

According to an exemplary embodiment, the at least one safety latch is retractable from a passive state to an activated state by mounting the receiving unit to the processing tool unit by the first interlocking mechanism. In the passive state, the second interlocking mechanism is blocked preventing a mounting of the base unit to the processing tool unit. In the activated state, the base unit is mountable to the processing tool unit by the second interlocking mechanism.

The passive state can also be referred to as a passive blocking state since a mounting of the base unit is prevented, because the connecting mechanism is blocked, in the case a receiving unit is not mounted to the processing tool unit.

According to an exemplary embodiment, the safety latch is maintained in the activated state by a mounted base unit. In the activated state, the safety latch blocks the first interlocking mechanism preventing a de-mounting of the receiving unit when the base unit is mounted to the processing tool unit.

In one example, upon mounting the base unit to the processing unit, the safety latch is secured in a locking position, in which the first interlocking mechanism is blocked, i.e. blocking a de-mounting the receiving unit from the processing unit. In the locking position, a disassembling or releasing of the receiving unit from the processing unit is thus inhibited.

In other words, the receiving unit the safety latch blocks the second the interlocking mechanism, and with mounted base unit, the safety latch also blocks the first interlocking mechanism.

In one example the safety latch provides double blocking function.

In another example, the at least one safety latch is provided to be movable at least from a passive state to an activated state by mounting the receiving unit to the processing tool unit by the first interlocking mechanism. In the passive locking state, the second interlocking mechanism is blocked preventing a mounting of the base unit to the processing tool unit. In the activated state, the base unit is mountable to the processing tool unit by the second interlocking mechanism.

In one example, the safety latch is moved from the passive state to the activated state when the receiving unit is mounted and thus connected to the processing tool unit. When de-mounting, or releasing, the receiving unit from the processing tool unit, the safety latch is moved from the activated state to the passive state, in which a mounting by the second interlocking mechanism is prevented, i.e. inhibited.

According to an exemplary embodiment, the safety latch is movable to a locking state by mounting the receiving unit to the processing unit. In the locking state, the first interlocking mechanism is blocked from de-mounting the receiving unit from the processing unit when the base unit is mounted.

Instead of moving the safety latch, it is also provided to place a locking protrusion, provided at the base unit, next to the latch, blocking the latter.

According to an exemplary embodiment, the safety latch is movable in a latch direction transverse to a locking direction of the first interlocking mechanism. A gear mechanism is provided for transforming an activating movement in the locking direction into a retracting movement in the latch direction for retracting the safety latch.

The locking direction of the first interlocking mechanism may be a direction transverse to an assembly direction of the receiving unit to the processing tool unit. The locking direction may also be referred to as a mounting direction for actually mounting the receiving unit to the processing tool unit by the first interlocking mechanism. The assembly direction is the more general direction for assembling the different units to each other. For example, the processing tool unit is assembled to the receiving unit from above and is locked by a rotating movement of the tool units in relation to each other. Thus, the assembly direction is vertical and the locking direction is clockwise or counter-clockwise in the horizontal plane. The terms vertical and horizontal relate to a normal operation position of the household food-processing device, for example, when placed on a working surface such as a table. The second interlocking mechanism may also comprise a locking direction, which may be equal or opposite to the locking direction of the first interlocking mechanism.

According to an exemplary embodiment, the safety latch is provided as a first lever, which is movable in an assembly direction. As the gear mechanism, the locking device comprises at least one secondary lever, which is movable in the locking direction of the first interlocking mechanism. The first lever is movably guided with a protrusion in a guiding slot of the secondary lever, which slot is provided at least slightly inclined to the locking direction such that, when the secondary lever is moved, the first lever is displaced in the assembly direction.

The secondary lever is a guiding element, wherein the first lever is in guiding engagement with the guiding element. The guiding element is moved by a protrusion of the receiving unit, which protrusion engages with a recess or a protrusion of the guiding element.

According to an exemplary embodiment, in the passive state, the safety latch is projecting from a contacting face of the processing tool unit for an abutment of a contacting face of the base unit. When mounting the receiving unit to the processing tool unit, the safety latch is refracted such that it is less projecting from the contacting face allowing an abutment of the contacting face of the base unit.

The projecting first lever prevents the mounting of the base unit to the processing tool unit. The base unit can only be mounted when the first lever is retracted. The first (or primary) lever is a liner lever, and the secondary lever is a rotating or sliding lever.

The assembly direction is the direction in which the components/units are moved for the mounting process, e.g. a linear direction. The locking direction is a moving direction applied for connecting the units, e.g. a twisting or screwing or rotating or pivoting movement, as indicated before.

The rotary lever may be connected to the receiving unit, and the linear lever is movably held by the rotary lever. The first and/or second interlocking mechanism may be provided as a bayonet-fitting.

According to an exemplary embodiment, the secondary lever is movable between a start position, in which the first lever is in the passive state, and an end position, in which the first lever is in the activated state. The secondary lever is provided with a biasing mechanism for biasing the secondary lever in the start position.

The biasing mechanism may be provided as a spring element biasing the secondary lever in the start position, wherein for bringing the secondary lever in the end position, and thus the first lever into the activated state, a force has to be applied for overruling or counter-acting against the biasing force of the spring element. The spring element can be provided as a resilient element or as a spring member. The biasing mechanism can also be provided as a snap mechanism with a snap hook engageable with at least a first recess in the start position, according to a further example.

According to an exemplary embodiment, the base unit is provided with i) a drive unit mount for receiving a hand-blender main part as a drive unit, or ii) a motor as a drive unit.

According to an exemplary embodiment, in case i) of the drive unit mount, a secondary safety mounting mechanism is provided, according to which, when a drive unit is received in the drive unit mount, in the mounted state the receiving unit is blocked from being de-mounted from the processing tool unit and in the mounted state, the processing tool unit is blocked from being de-mounted from the base unit.

The secondary safety mounting mechanism defines a redundant safety concept. The secondary safety mounting mechanism blocks the first and the second interlocking mechanism. In another example, an activating safety mechanism is provided, according to which the drive unit can be switched on only if the receiving unit is mounted to the processing tool unit and the processing tool unit is mounted to the base unit. In case ii) of a motor as a drive unit, the activating safety mechanism is provided, according to which the motor can be switched on only if the receiving unit is mounted to the processing tool unit and the processing tool unit is mounted to the base unit.

The hand-blender is also referred to as a handheld-blender. The drive unit mount, which can also be referred to as an insertion connection, is a receptacle for the connection transmission links of a hand-blender. The driving force is provided by the hand-blender. The household food-processing device can therefore also be referred to as a hand-blender driven accessory. Instead of the hand-blender, other external devices can be provided as drive unit, and connected via the drive unit mount.

As an alternative, as mentioned under ii), a motor can be provided for driving the processing tool. In addition, the motor can be provided with a gearing mechanism for transmitting the driving force in an appropriate speed and with a suitable torque.

According to a second aspect of the present invention, a method for a safety assembly of a household food-processing device is provided, comprising the following steps:
a) In a first step, a processing tool unit is provided with a processing tool for processing supplied food.
b) In a second step, a receiving unit with a receiving volume for receiving the processed food is detachably mounted to the processing tool unit.
c) In a third step, a base unit is detachably mounted to the processing tool unit, which base unit provides a driving force for actuating the processing tool.

The processing tool unit is provided with a safety mounting mechanism defining a mounting order, according to which the base unit is mountable to the processing tool unit only when the receiving unit is mounted to the processing tool unit. Also according to the mounting order, the de-mounting of the receiving unit from the processing tool unit is blocked when the base unit is mounted to the processing tool unit.

In an example, in step b), the receiving unit is mounted to the processing tool unit with a first interlocking mechanism. In step c), the -base unit is mounted to the processing tool unit with a second interlocking mechanism. The safety mounting mechanism comprises a safety locking device, with at least one safety latch acting between the first and the second interlocking mechanism. In step b), the at least one safety latch is moved from a passive state to an activated state by mounting the receiving unit to the processing tool unit. In the passive state, the second interlocking mechanism is blocked to prevent a mounting of the base unit to the processing tool unit. In the activated state, the base unit is mountable to the processing tool unit by the second interlocking mechanism.

In another example, in step c), the safety latch is secured in a locking position, in which the first interlocking mechanism is blocked from de-mounting the receiving unit from the processing unit.

In a further example, in step b), the safety latch is refracted from a passive state to an activated state by the mounting of the receiving unit to the processing tool unit by the first interlocking mechanism. In the passive state, the second interlocking mechanism is blocked preventing a mounting of the base unit to the processing unit. In the activated state, the base unit is mountable to the processing tool unit by the second interlocking mechanism.

According to an aspect of the present invention, for the assembly of three separate units, namely the container or bowl, the unit comprising the tool, for example an exchangeable tooling insert, and the base unit for driving the device, these are assembled together in a predefined mounting order. Therefore, a safety mechanism is provided that interacts with both connection interfaces for a) connecting the bowl to the tool unit, and b) connecting the tool unit to the base unit. By a simple mechanic interaction, a mounting, as well as a de-mounting, can be prevented, thereby defining a particular mounting order and also a de-mounting order. With such mounting order it can be assured that the tool unit is covered on the lower side with a container, so that it is not possible to touch the processing tool itself, or other dangerous movable components of the mechanism, when the mechanism is operated by a driving means. This is because, upon mounting the base unit, after which the operation of the processing tool is theoretically possible, the connection mechanism of the bowl with the tool unit is blocked. Therefore, a configuration, in which the base unit is mounted to the processing tool unit, and the processing tool unit on the other hand is freely accessible from the other side, is securely prevented. For the safety mechanism, movable elements are provided, which are activated or moved or translated, by connecting the lower portion, i.e. the bowl or container, to the processing tool unit. Thus, simultaneously with the mounting of the bowl to the processing tool unit, the safety mechanism is activated to allow also a mounting of the base unit. While mounting the base unit, the safety mechanism is once again simultaneously further activated, namely by maintaining the safety element in a position, in which the de-mounting of the lower portion is prevented.

These and other aspects of the present invention will become apparent from and be elucidated with reference to the embodiments described hereinafter.

BRIEF DESCRIPTION OF THE DRAWINGS

Exemplary embodiments of the invention will be described in the following with reference to the following drawings:

FIG. 2 shows the receiving unit and the processing tool unit of FIG. 1 in a first, mounting state, wherein

FIG. 3 shows the receiving unit and the processing tool unit of FIG. 1 in a second, locking safety state, wherein

DETAILED DESCRIPTION OF EMBODIMENTS

Figure 1:
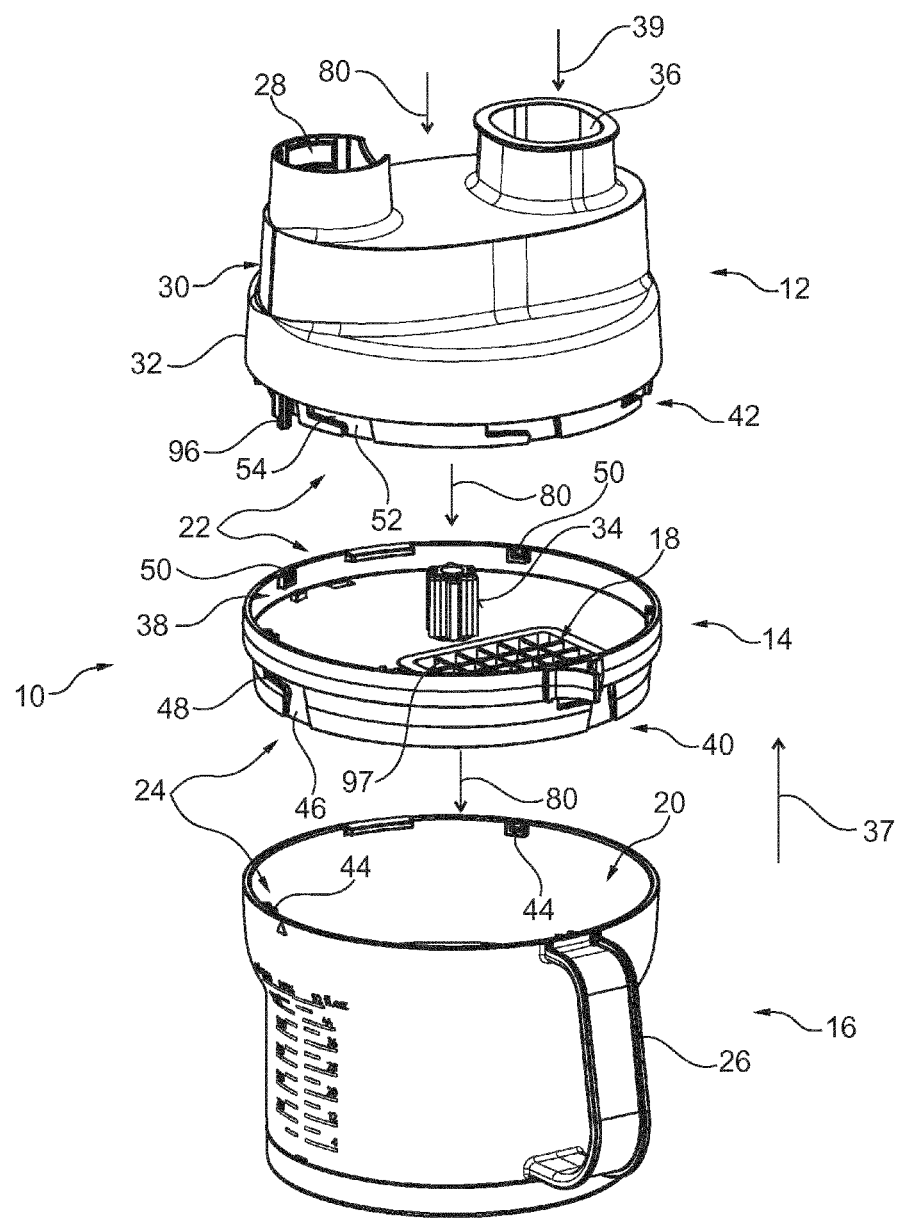
FIG. 1 shows an example of a household food-processing device in a perspective view showing a receiving unit, a processing tool unit, and a base unit, when seen from below.

FIG. 1 shows a household food-processing device 10, comprising a base unit 12, a processing tool unit 14, and a receiving unit 16. The processing tool unit 14 comprises a processing tool 18 for processing supplied food, such as a rotating cutting knife 19. The receiving unit 16 comprises a receiving volume 20 for receiving the processed food. The base unit 12 provides, respectively transmits, a driving force for actuating the processing tool 18. The receiving unit 16 is mountable to the processing tool unit 14, and the base unit 12 is mountable to the processing tool unit 14, e.g. for example from two different sides. For example, a first bayonet-connection 24 is provided for connecting the processing tool unit 14 with the receiving unit 16; and a -second bayonet-connection 22 is provided for connecting the base unit 12 to the processing tool unit 14. The receiving unit 16 may be equipped with a handle 26.

The base unit 12 may be equipped with a drive unit mount 28 for receiving a (not shown) hand-blender main part as a drive unit. A gearing mechanism 30 is provided inside a housing structure 32. The gearing mechanism 30 transmits forces for driving the processing tool 18 via a drive shaft 34 provided at the processing tool unit 14. Further, a food insertion opening 36 is provided for supplying food to be processed.

The processing tool unit 14 is provided with a safety mounting mechanism 38 defining a mounting order, according to which the base unit 12 is mountable to the processing tool unit 14 only when the receiving unit 16 is mounted to the processing tool unit 14, and according to which the de-mounting of the receiving unit 16 from the processing tool unit 14 is blocked when the base unit 12 is mounted to the processing tool unit 14. This shall be explained in the following with reference to the following drawings in more detail.

The receiving unit 16, the processing tool unit 14 and the base unit 12 are mountable in an order of mounting, namely from the bottom to the top, which is in a direction reverse from a feed-through direction 39 of foodstuff to be processed, which in FIG. 1 is directed from top to bottom, i.e. in a vertical downwards direction. The direction of the order of the mounting is also referred to as mounting direction, indicated with an arrow 37. An order of de-mounting is arranged in a revers manner.

The receiving unit 16 is detachably mounted to the processing tool unit 14 with a first interlocking mechanism 40, for example the above-mentioned first bayonet-connection 24, also referred to as first bayonet-locking The base unit 12 is detachably mounted to the processing tool unit 14 with a second interlocking mechanism 42, for example the above-mentioned second bayonet-connection 22, also referred to as second bayonet-locking. As can be seen in FIG. 1, the first bayonet-connection 24, i.e. the first interlocking mechanism 40 comprises first protrusions 44 on the receiving unit 16, respectively at the inner edge of the container. The processing tool unit 14 comprises first receiving openings 46 for inserting the first protrusions 44 and sidewards directed first slot portions 48 for inserting the first protrusions 44 in a sidewards directed relative movement to temporarily secure and fasten the processing tool unit 14 to the receiving unit 16.

A similar second connection is provided as the second interlocking mechanism 42. Second protrusions 50 are provided on the inner side of the upper edge of the processing tool unit 14 to be inserted into second receiving openings 52 provided on the outer edge of the base units lower portion, and to be moved into and along sidewards directed second slot portions 54, e.g. horizontally arranged slots, for temporarily locking the base unit 12 to the processing tool unit 14.

Figure 2A:
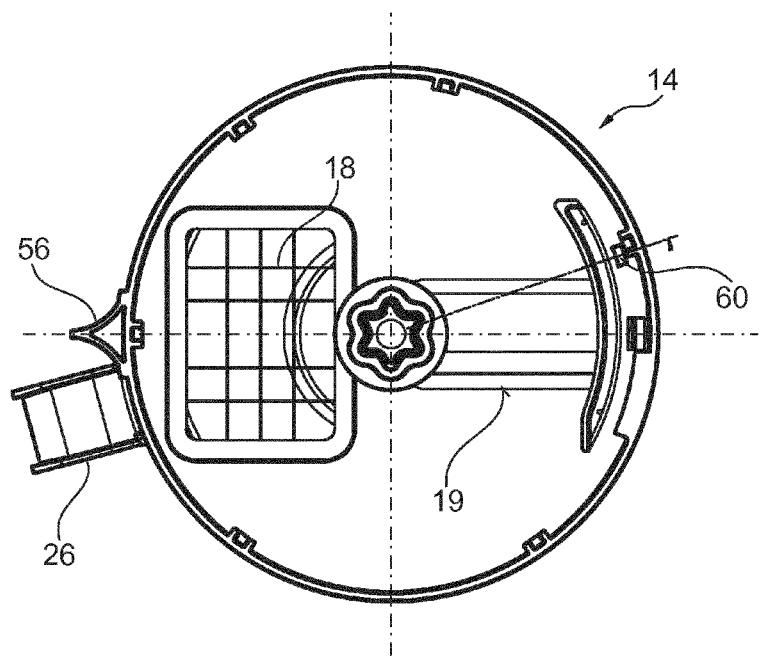
FIG. 2A shows a top view, FIG. 2B a cross-sectional view along cutting plane C-C, FIG. 2C a bottom view, and FIG. 2D detailed perspective illustration of the safety mechanism.

FIG. 2A shows a top view of the processing tool unit 14 placed on top of the receiving unit 16. In this state, the protrusions 44 are inserted into the opening 46. The processing tool unit 14 is provided with a moving knob 56 for providing a rotating relative movement between the receiving unit 16 and the processing tool unit 14, for example by moving the knob 56 and the handle 26 towards each other.

The safety mounting mechanism 38 is provided in the processing tool unit 14, and comprises a safety locking device 58 with at least one safety latch 60 acting between the first interlocking mechanism 40 and the second interlocking mechanism 42. The safety mounting mechanism 38 is shown in more detail in a perspective view in FIG. 3D.

The safety locking device 58 is provided to detect a mounted receiving unit and to release a locking of the second interlocking mechanism 42 for mounting of the base unit 12 in case of a detected mounted receiving unit 14. Thus, the detection of the receiving unit can also be referred to as "bowl detection".

Figure 2B:
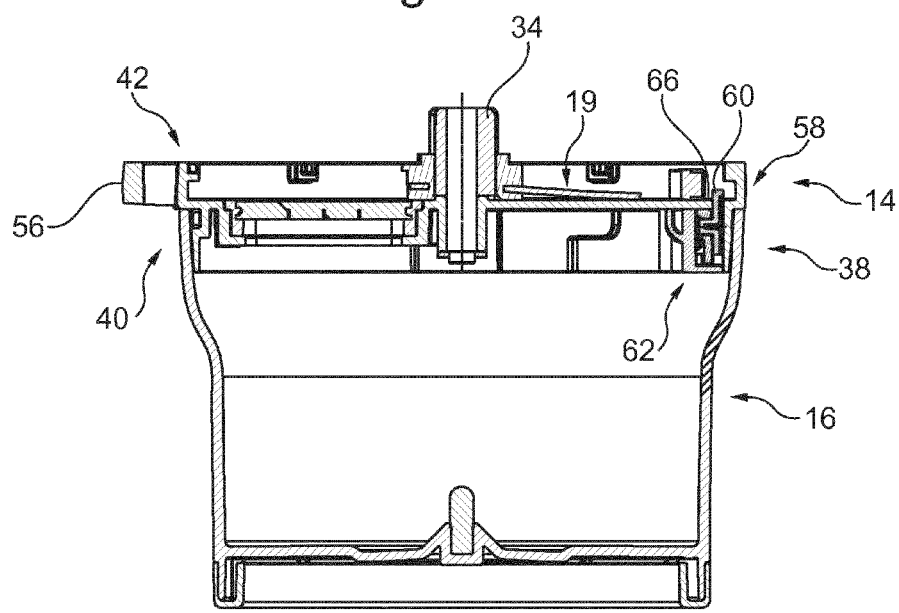
Figure 2C:
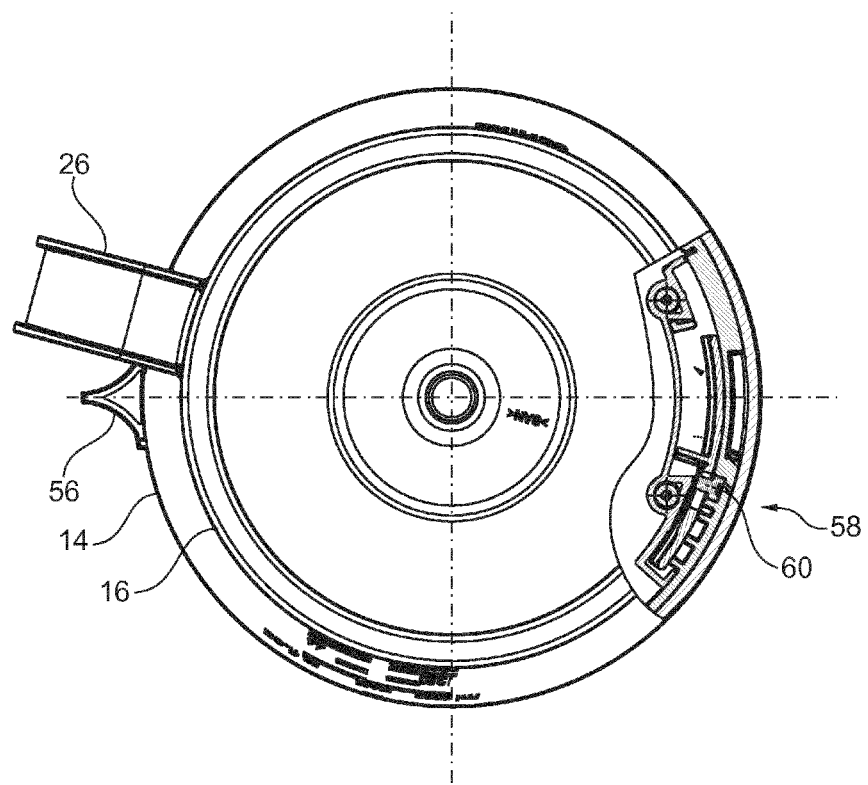
Figure 2D:
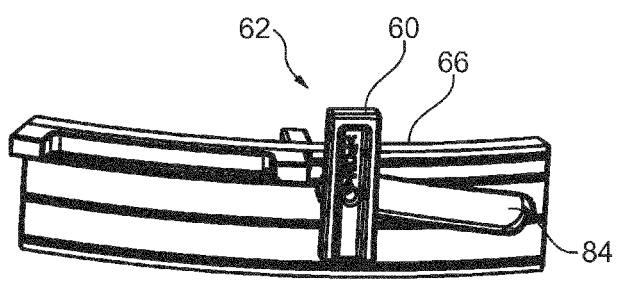
Figure 3A:
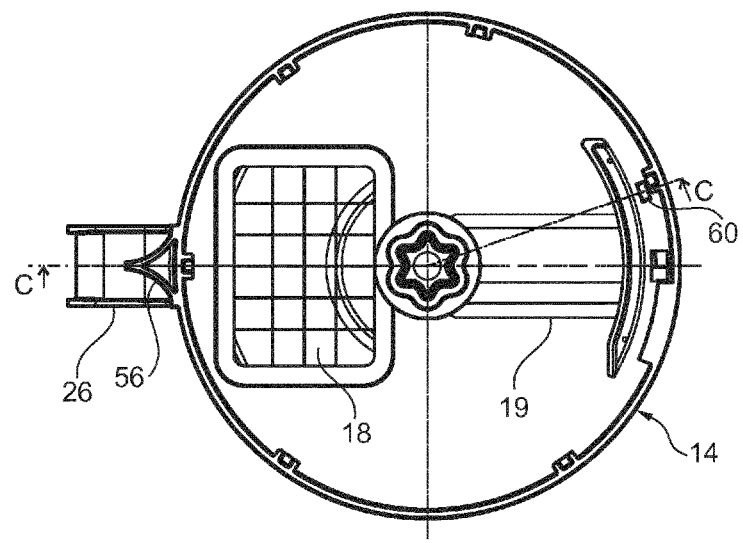
FIG. 3A shows a top view, FIG. 3B a cross-sectional view along cutting plane C-C, FIG. 3C a bottom view, and FIG. 3D detailed perspective illustration of the safety mechanism.
Figure 3B:
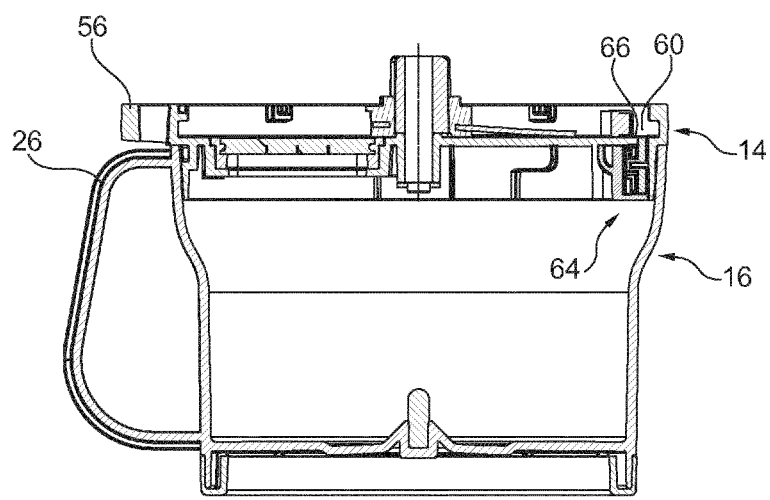
Figure 3C:
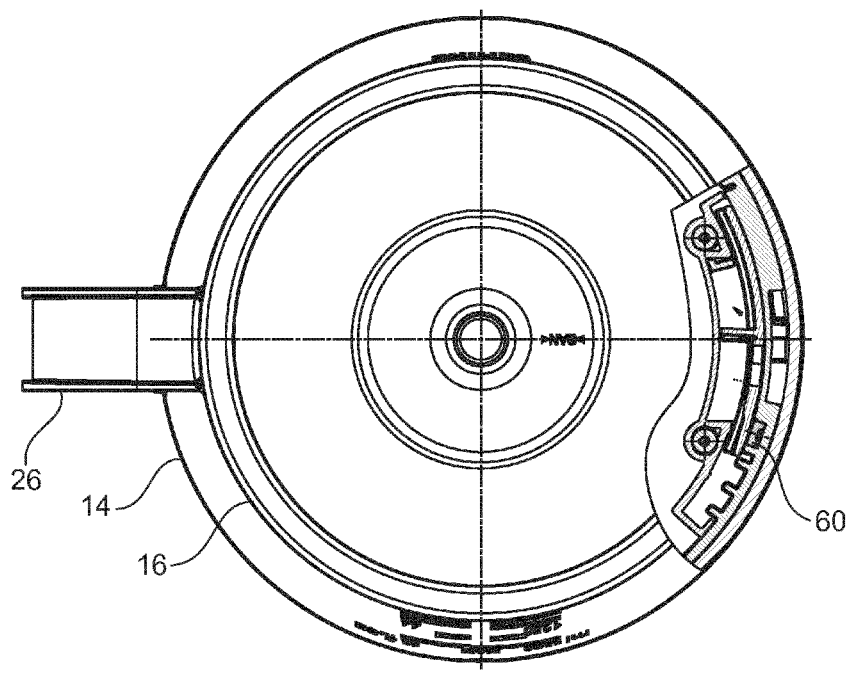
Figure 3D:
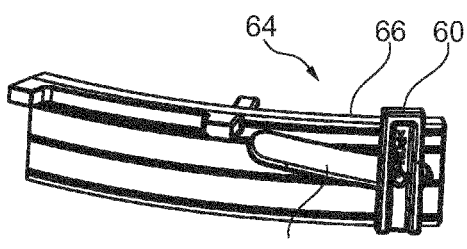

The at least one safety latch 60 can be retracted from a passive state 62, see FIG. 2B and 2D for example, to an activated state 64, see FIG. 3B and 3D for example. This is achieved by mounting the receiving unit 16 to the processing tool unit 14 by the first interlocking mechanism 40, as indicated in FIG. 3A and 3B. It is noted that FIG. 3A shows the top view of FIG. 2A, in which, however, the knob 56 and the handle 26 are aligned, i.e. the receiving unit 16 and the processing tool unit 14 are rotated in relation to each other such that the protrusions 44 are arranged in the slots 48 of the bayonet-locking Simultaneously, i.e. while rotating the two units in relation to each other, the safety latch 60 is brought into the activated state 64, as mentioned above.

In the passive state 62, the second interlocking mechanism 42 is blocked preventing a mounting of the base unit 12 to the processing tool unit 14. In the activated state 64, the base unit 12 is mountable to the processing tool unit 14 by the second interlocking mechanism 42. Hence, the receiving unit the safety latch blocks the second the interlocking mechanism, and with mounted base unit, the safety latch also blocks the first interlocking mechanism.

For example, in the passive state 62, the safety latch 60 is projecting from a contacting face 66 of the processing tool unit 14 for an abutment of a contacting face (not further shown in FIG. 2B) of the base unit 12. When mounting the receiving unit 16 to the processing tool unit 14, the safety latch 60 is refracted such that it is less projecting from the contacting face 66 allowing an abutment of the contacting face of the base unit, which is shown in FIG. 3B, however without the base unit 12. The reduced protrusion or projecting of the safety latch 60 is also visible in FIG. 2D and 3D in comparison.

The safety latch 60 is maintained in the activated state 64, i.e. in the retracted state, by mounting the base unit 12. Thus, in the activated state 64, the safety latch 60 blocks the first interlocking mechanism 40, preventing a demounting of the receiving unit 16, when the base unit 12 is mounted to the processing tool unit 14.

According to a further example (not shown), the safety latch is movable to a lockable state by mounting the receiving unit to the processing tool unit. In the lockable state, the first interlocking mechanism is blocked from de-mounting the receiving unit from the processing unit when the base unit is mounted. The base unit locks the latch.

Figures 4, 5:
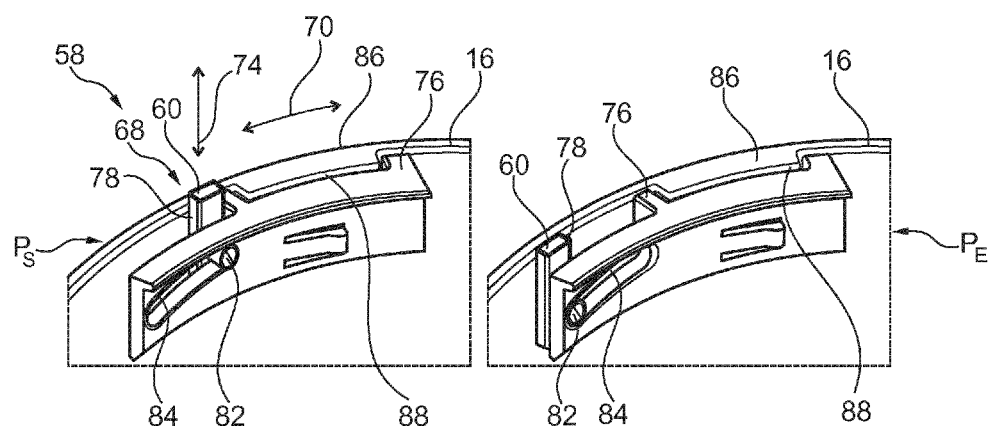
FIG. 4 shows a detailed perspective illustration of the safety mechanism in a first state.
FIG. 5 shows the safety mechanism of FIG. 4 in a further state.

As shown in FIGS. 4 and 5, in addition to FIGS. 2D and 3D, a gearing mechanism 68 is provided for transforming an activating movement in a locking direction 70 (rotation), into a retracting movement (translation) in the latch direction, indicated with a double-arrow 74, for retracting the safety latch 60. The safety latch is thus movable in the latch direction 74 transverse to the locking direction 70 of the first interlocking mechanism 40. As the gear mechanism 68, the locking device 58 comprises at least one secondary lever 76, which is movable in the locking direction 70 of the first interlocking mechanism 40. The safety latch 60 is thus provided as a first lever 78, which is movable in an assembly direction, indicated in FIG. 1 with arrow 80. The first lever 78 is movably guided with a protrusion 82 in a guiding slot 84 of the secondary lever, which slot 84 is provided at least slightly inclined to the locking direction 70 such that, when the secondary lever 76 is moved, the first lever 78 is displaced in the assembly direction 80, or the latch direction 74 respectively. As can be seen in FIG. 5, the secondary lever 76 is moved by an engagement of a protrusion 86 of the receiving unit 16 with a recess 88 of the secondary lever 76. Thus, while rotating the receiving unit 16 and the processing tool unit 14 at least a certain degree in relation to each other, the secondary lever 76 is also rotated and thus the guiding of the protrusion 82 of the safety latch 68 in the inclined slot 84 leads to a vertical retraction of the safety latch 60.

Figure 6:
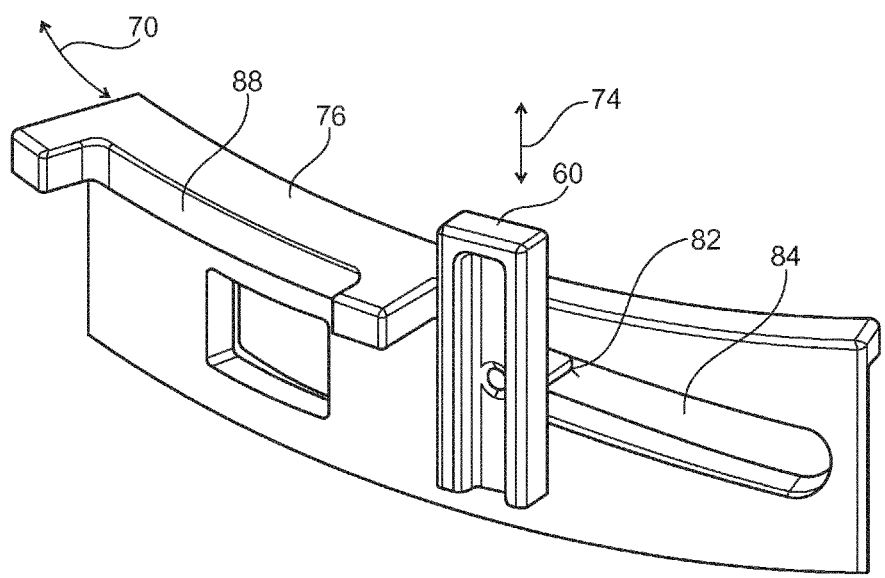
FIG. 6 shows the safety mechanism in a detailed perspective view.

FIG. 6 shows the secondary lever 76 together with the safety latch 60 as the first lever, wherein the secondary lever can also be referred to as rotary lever and the safety latch as linear lever. The guiding slot 84 can be referred to as motion link.

Figure 7:
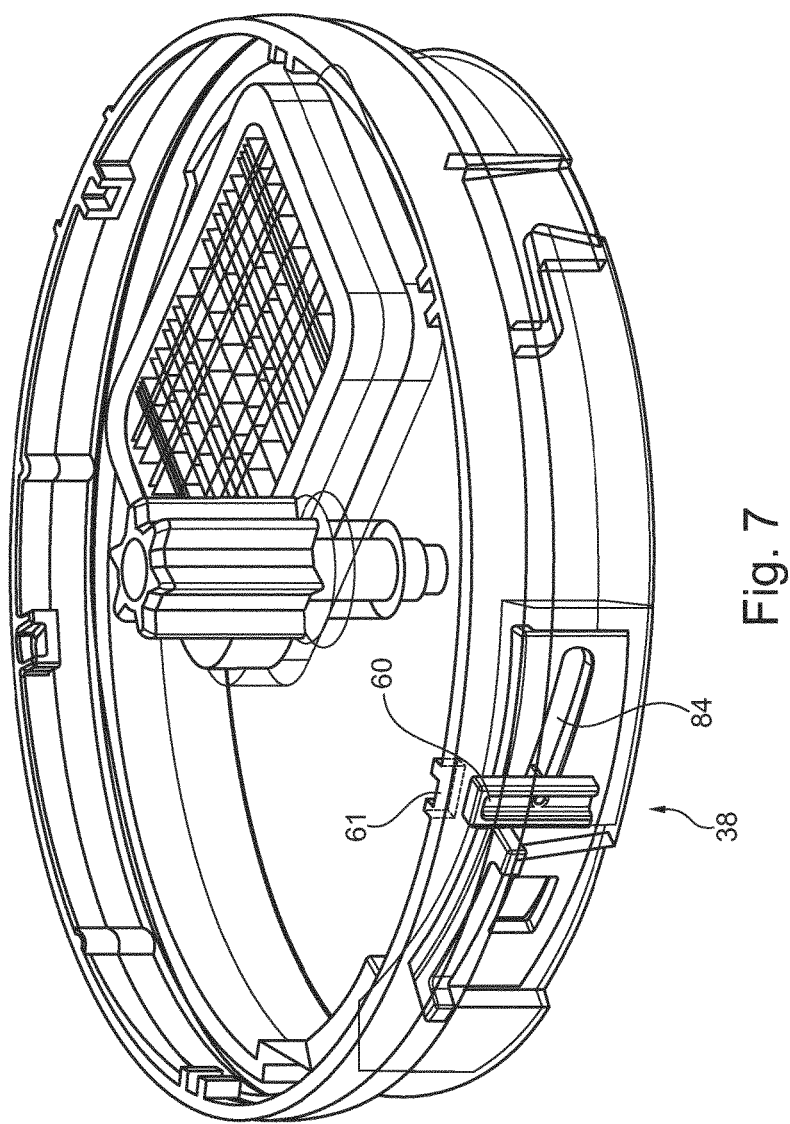
FIG. 7 shows a further example of a processing tool unit in a perspective view.

FIG. 7 shows a further example of the safety mounting mechanism 38. A counter protrusion 61 on the base unit is provided abutting the upper edge of the safety latch 60.

As can be understood from the above-mentioned figure descriptions of FIGS. 4 and 5 in particular, for de-mounting the receiving unit 16, the safety latch 60 would have to be brought into the initial starting position due to the coupling of the protrusion 86 and the recess 88. Thus, the safety latch would be protruding above the surface. However, if a base unit 12 is mounted, the safety latch 60 would be prevented from projecting of the abutting surface, since the counter protrusion (or counter abutting surface) is blocking the safety latch from moving upwards again.

FIGS. 4 and 5 also show that the secondary lever 76 is movable between a start position $P_S$, in which the first lever 78 is in the passive state, and an end position $P_E$, in which the first lever 78 is in the activated, i.e. the retracted state.

Figure 8:
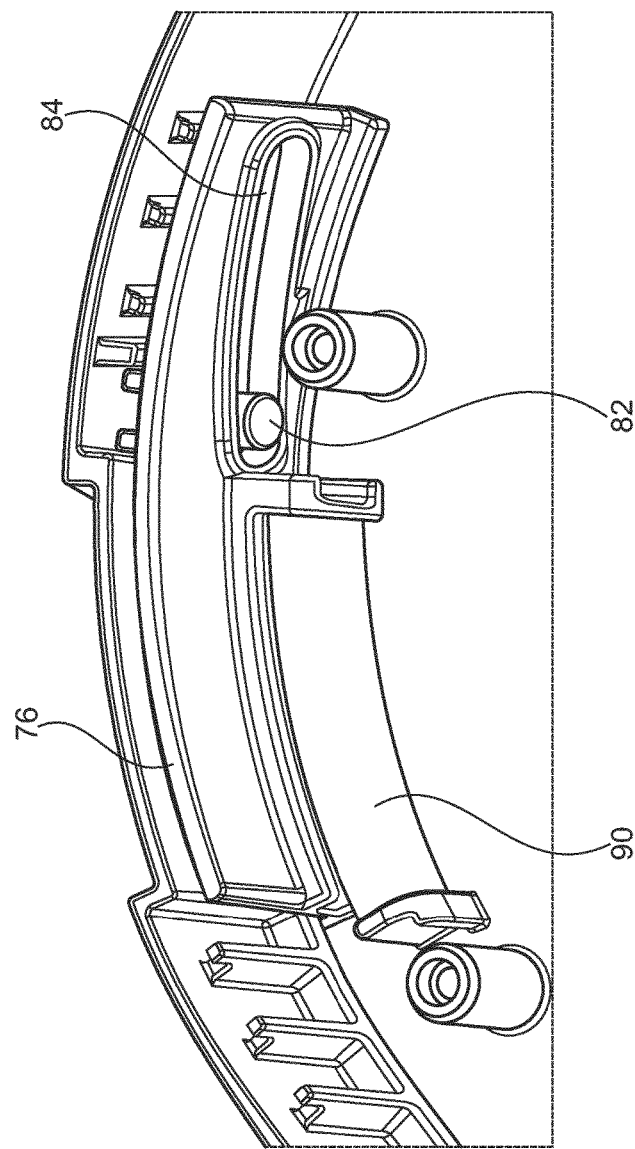
FIG. 8 shows a further detailed perspective view of the safety mechanism with a biasing element in a first example.

As shown in FIG. 8, a biasing mechanism, for example in form of a spring element 90 is provided for biasing the secondary lever 76 in the start position.

Figure 9B:
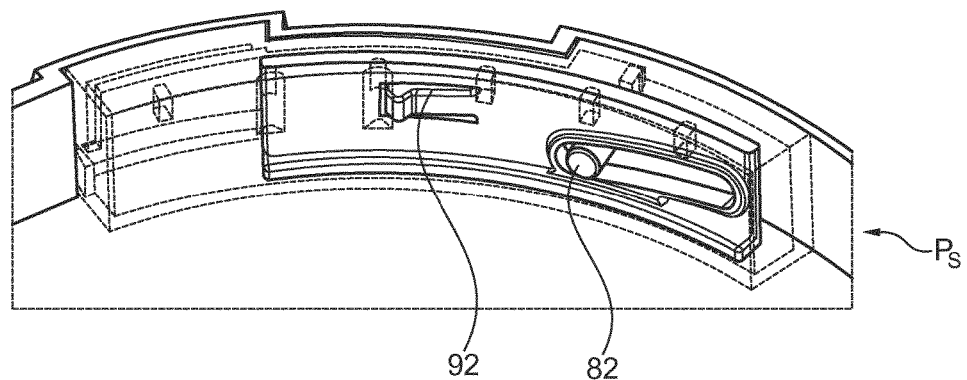
FIG. 9 shows a further example of a biasing element of the safety mechanism in a first state in FIG. 9A and in a second state in FIG. 9B.
Figure 9A:
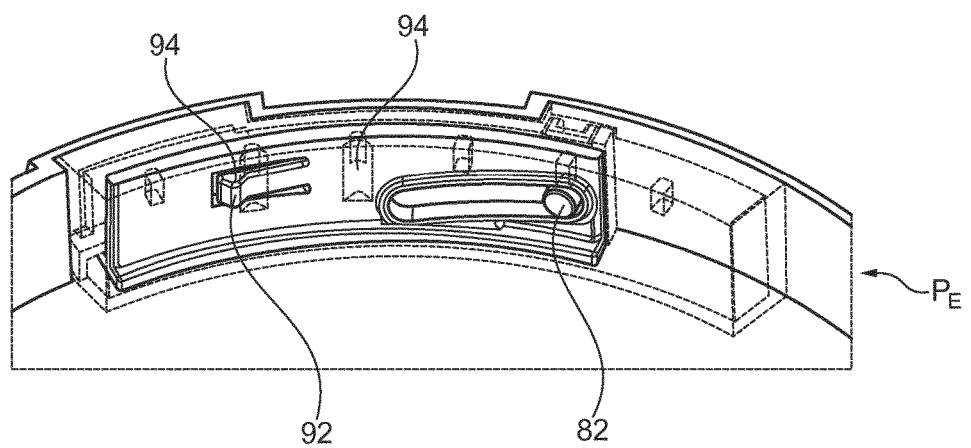

FIGS. 9A and 9B show a snap hook connection as a biasing mechanism in form of a snap hook 92 that can engage recesses 94.

As a further option, in case of the drive unit mount 28, a secondary safety mounting mechanism 96 is provided, according to which, when a drive unit (not shown) is received in the drive unit mount 28, in the mounted state the receiving unit is blocked from being de-mounted from the processing tool unit and in the mounted state, the processing tool unit is blocked from being de-mounted from the base unit. For example, the secondary safety mounting mechanism 96 may comprise a vertically extending rod that is interacting with the first and second interlocking mechanisms 40, 42.

Figure 10:
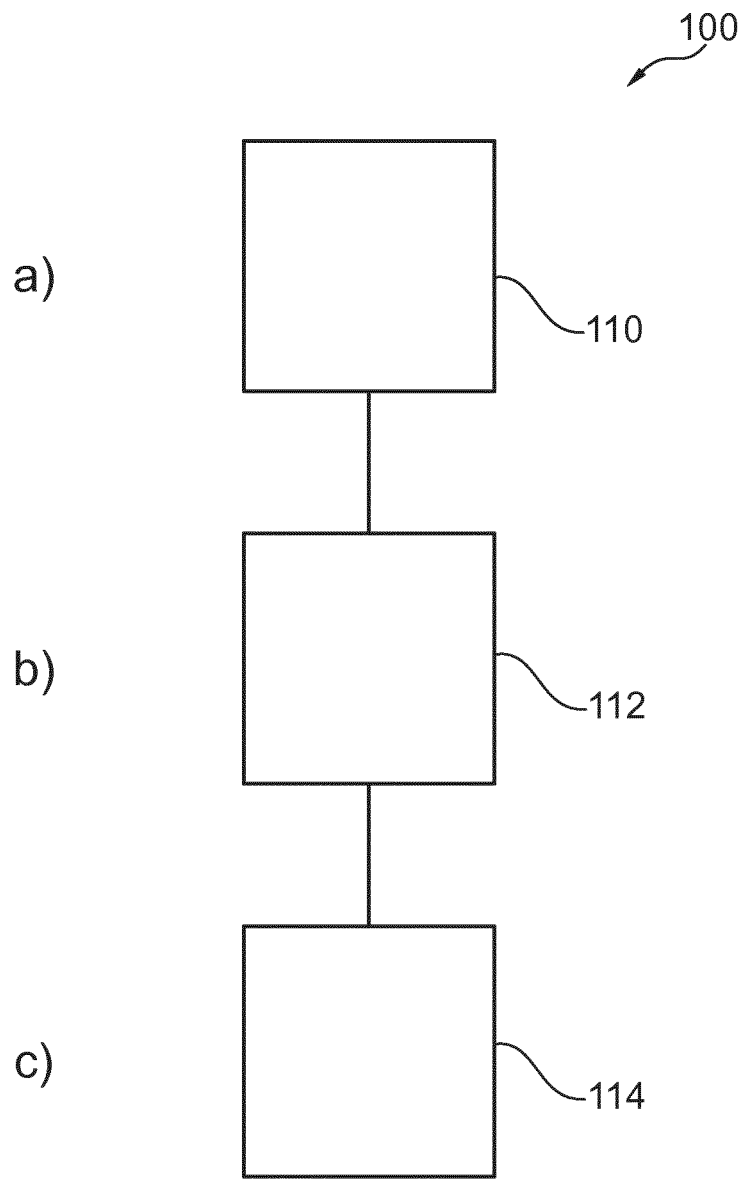
FIG. 10 shows basic steps of an exemplary method for a safety assembly of a household food-processing device.

FIG. 10 shows a method 100 for a safety assembly of a household food-processing device, comprising the following steps. In a first step 110, a processing tool unit with a processing tool for processing supplied food is provided. In a second step 112, a receiving unit with a receiving volume for receiving the processed food is detachably mounted to the processing tool unit. In a third step 114, a base unit, which provides a driving force for actuating the processing tool is detachably mounted to the processing tool unit. The processing tool unit is provided with a safety mounting mechanism defining a mounting order, according to which the base unit is mountable to the processing tool unit only when the receiving unit is mounted to the processing tool unit. Further, according to the mounting order, the de-mounting of the receiving unit from the processing tool unit is blocked when the base unit is mounted to the processing tool unit. The first step 110 may also be referred to as step a), the second step 112 as step b), and the third step 114 as step c).

According to the above-mentioned examples, different, exchangeable tooling inserts, such as a cube-cutter grid 97 can be provided. However, this allows the user to come into an unintended interaction with the rotating knife (not further shown) inside the processing tool unit 14. Thus, an activation of the rotating knife is only possible by mounting the base unit to the processing tool, which on the other hand is only possible when the receiving unit 16 has been mounted to the processing tool unit, so that any access to the rotating knife is prevented for those states, in which the knife or the like may be operated.

Thus, it is possible to provide a number of replaceable grids to choose different cube size, for example. In other words, the bowl detection avoids injury of the user. With the bowl detection unit, it is guaranteed that the user can only switch on the device when the bowl is attached to the tool unit.

The gear mechanism described above may also be referred to as motion link that converts the rotary movement of the bowl into a linear movement of the linear lever, for example during the assembling and disassembling phase.

The linear lever, i.e. the safety latch 60, may be self-locking against vertical force on it, for example because of the small angle in the motion link. Thus, it is possible to operate the system without additional spring per se. The rotary lever describes a rotary movement, because linked to the receiving unit 16, and converts it into the necessary linear movement of the linear lever, i.e. the safety latch 60.

According to an example, as the logical order of assembling process, it is provided to mount the bowl, or receiving unit, and the processing unit together. Thereby, the linear lever releases the bayonet-closure between processing unit and base unit. As a second step, the base unit is mounted to the processing unit. Now it is not possible any more to dissemble the bowl, i.e. the receiving unit, from the processing tool unit. As a further step, a hand-blender or the like can be mounted on the base unit. The disassembling is provided in a reverse order (not further shown).

Instead of a bayonet locking also other connection mechanisms are provided, such as a screw-type, snap-type, latch type or the like. Further, also other mechanisms are provided for moving, or activating, the safety latch.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A household food-processing device, comprising:
a base unit;
a processing tool unit including a processing tool configured to process supplied food; and
a receiving unit configured to receive the processed food from the processing tool unit;
wherein the base unit is configured to provide a driving force to actuate the processing tool;
wherein the receiving unit is mountable to the processing tool unit, and the base unit is mountable to the processing tool unit in a specific mounting order to ensure user safety; and
wherein the processing tool unit is provided with a primary safety mounting mechanism defining the specific mounting order, according to which the base unit is first mountable to the processing tool unit only when the receiving unit is mounted to the processing tool unit; and according to which a de-mounting of the receiving unit from the processing tool unit is blocked when the base unit is mounted to the processing tool unit thereby providing a user safety feature.

2. The household food-processing device according to claim 1, wherein the receiving unit, the processing tool unit and the base unit are mountable in the specific order of mounting order, which constitutes a reverse direction from a feed-through direction of foodstuff to be processed.

3. The household food-processing device according to claim 1,
wherein the receiving unit is detachably mounted to the processing tool unit with a first interlocking mechanism;
wherein the base unit is detachably mounted to the processing tool unit with a second interlocking mechanism; and
wherein the primary safety mounting mechanism comprises a safety locking device with at least one safety latch acting between the first and the second interlocking mechanisms.

4. The household food-processing device according to claim 3,
wherein the safety locking device is provided to detect the receiving unit mounted to the processing tool; and
wherein the safety locking device is configured to release a blocking feature of the second interlocking mechanism directed to block the mounting of the base unit, the release occurring in the case where the receiving unit mounted to the processing tool is detected by the safety locking device.

5. The household food-processing device according to claim 3,
wherein the at least one safety latch is retractable from a passive state to an activated state by mounting the receiving unit to the processing tool unit by the first interlocking mechanism;
wherein in the passive state, the second interlocking mechanism is blocked thereby preventing a mounting of the base unit to the processing tool unit; and
wherein in the activated state, the second interlocking mechanism allows the base unit to be mounted to the processing tool unit.

6. The household food-processing device according to claim 5, wherein, in the passive state, the safety latch is projecting from a contacting face of the processing tool unit for an abutment of a contacting face of the base unit; and
wherein, when mounting the receiving unit to the processing tool unit, the safety latch is retracted such that it is less projecting from the contacting face of the processing tool allowing the abutment of the contacting face of the base unit.

7. The household food-processing device according to claim 6, wherein the secondary lever is movable between a start position, in which the first lever is in the passive state, and an end position, in which the first lever is in the activated state; and
wherein the secondary lever is provided with a biasing mechanism for biasing the secondary lever in the start position.

8. The household food-processing device according to claim 3,
wherein the safety latch is maintained in an activated state when the base unit is mounted to the processing tool unit; and
wherein, in the activated state, the safety latch blocks the first interlocking mechanism thereby preventing a demounting of the receiving unit when the base unit is mounted to the processing tool unit.

9. The household food-processing device according to claim 3,
wherein the safety latch is moveable to a locking state by mounting the receiving unit to the processing tool unit; and
wherein in the locking state, the first interlocking mechanism is blocked from de-mounting the receiving unit from the processing tool unit when the base unit is mounted to the processing tool unit.

10. The household food-processing device according to claim 3,
wherein the safety latch is movable in a latch direction transverse to a locking direction of the first interlocking mechanism; and
wherein a gear mechanism is provided for transforming an activating movement of the first interlocking mechanism in the locking direction into a retracting movement of the safety latch in the latch direction for retracting the safety latch.

11. The household food-processing device according to claim 10,
wherein the safety latch is provided as a first lever, which is movable in an assembly direction;

wherein, as the gear mechanism, the safety locking device comprises at least one secondary lever, which is movable in the locking direction of the first interlocking mechanism; and wherein the first lever is movably guided within a protrusion in a guiding slot of the secondary lever, which slot is at least slightly inclined to the locking direction such that, when the secondary lever is moved, the first lever is displaced in the assembly direction.

12. The household food-processing device according to claim 1, wherein the base unit is provided with:

i) a drive unit comprising a drive unit mount for receiving a handblender main part; or ii) a drive unit comprising a motor.

13. The household food-processing device according to claim 12, wherein in a case where the base unit is provided with the drive unit mount comprising a drive unit for receiving the hand-blender main part, a secondary safety mounting mechanism is provided in addition to the primary safety mounting mechanism, such that when the drive unit is received in the drive unit mount, the receiving unit in a mounted state is blocked from being de-mounted from the processing tool unit and the processing tool unit in the mounted state is also blocked from being de-mounted from the base unit.

* * * * *